(12) United States Patent
Schieber et al.

(10) Patent No.: US 12,319,299 B2
(45) Date of Patent: Jun. 3, 2025

(54) CONTROL UNIT FOR A MOTOR VEHICLE, MOTOR VEHICLE, AND METHOD FOR OPERATING A CONTROL UNIT

(71) Applicant: AUDI AG, Ingolstadt (DE)

(72) Inventors: Reinhard Schieber, Egweil (DE); Hans Georg Gruber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 197 days.

(21) Appl. No.: 18/040,116

(22) PCT Filed: Jul. 19, 2021

(86) PCT No.: PCT/EP2021/070085
§ 371 (c)(1),
(2) Date: Jan. 31, 2023

(87) PCT Pub. No.: WO2022/023096
PCT Pub. Date: Feb. 3, 2022

(65) Prior Publication Data
US 2023/0286521 A1    Sep. 14, 2023

(30) Foreign Application Priority Data
Jul. 31, 2020   (DE) .................. 10 2020 120 277.6

(51) Int. Cl.
*B60W 50/02* (2012.01)
*B60R 16/023* (2006.01)
(Continued)

(52) U.S. Cl.
CPC ..... *B60W 50/0205* (2013.01); *B60R 16/0231* (2013.01); *G07C 5/008* (2013.01); *G07C 5/0808* (2013.01); *G07C 5/085* (2013.01)

(58) Field of Classification Search
CPC ..... B60W 50/0205; B60W 2050/0005; B60W 2050/021; B60W 2050/143; B60W 50/14;
(Continued)

(56) References Cited

U.S. PATENT DOCUMENTS 11,526,602 B2   12/2022  Klein et al.
2002/0105353 A1*  8/2002  Mori ................ G01R 31/31716
                                                          324/750.01
(Continued)

FOREIGN PATENT DOCUMENTS

DE    102017219242 A1   5/2019
DE    102017221889 A1   6/2019

OTHER PUBLICATIONS

International Preliminary Report on Patentability directed to related International Patent Application No. PCT/EP2021/070085, completed Nov. 9, 2022, with attached English-language translation; 16 pages.

(Continued)

*Primary Examiner* — Hitesh Patel
*Assistant Examiner* — Wenyuan Yang
(74) *Attorney, Agent, or Firm* — Sterne, Kessler, Goldstein & Fox P.L.L.C.

(57) ABSTRACT

A control unit for a motor vehicle, having a system on a chip with at least one computing unit for providing at least one vehicle function for a vehicle system, with at least one memory unit, and with at least one interface unit, wherein the system on a chip has at least one subsystem, which is logically separate from the components of the system on a chip that implement the at least one vehicle function, for providing at least one motor-vehicle-related additional function that provides a service, wherein the subsystem comprises at least a computing section, an additional-function-specific interface section in particular, forming a proxy and (Continued)

an additional-function-specific communications bus that is connected at least to the computing section and to the interface section.

18 Claims, 2 Drawing Sheets

(51) Int. Cl.
  *G07C 5/00* (2006.01)
  *G07C 5/08* (2006.01)
(58) Field of Classification Search
  CPC .. B60R 16/0231; G07C 5/008; G07C 5/0808; G07C 5/085; G06F 15/7842; G06F 15/7807
  See application file for complete search history.

(56) References Cited

U.S. PATENT DOCUMENTS

| | | | |
|---|---|---|---|
| 2017/0039084 A1* | 2/2017 | Atsmon | H04L 67/12 |
| 2019/0389484 A1* | 12/2019 | Satyavolu | H04L 67/12 |
| 2020/0019253 A1* | 1/2020 | Kitagawa | B60K 35/60 |
| 2020/0021961 A1* | 1/2020 | Li | H04W 4/46 |
| 2020/0242276 A1 | 7/2020 | Klein et al. | |

OTHER PUBLICATIONS

International Search Report of the International Searching Authority directed to related International Patent Application No. PCT/EP2021/070085, mailed Oct. 29, 2021, with attached English-language translation; 6 pages.

Vaas, Steffen et al., "The Best of Both: High-Performance and Deterministic Real-Time by Application-Specific Multi-core SOCs," 2017 Conference on Design and Architectures for Signal and Image Processing (DASIP), IEEE, Sep. 27, 2017; 6 pages.

Urbina, Moises et al., "Multi-Core Architecture for Autosar based on Virtual Electronic Control Units," 2015 IEEE 20th Conference on Emerging Technologies & Factory Automation (ETFA), IEEE, Sep. 28, 2015; 5 pages.

* cited by examiner

CONTROL UNIT FOR A MOTOR VEHICLE, MOTOR VEHICLE, AND METHOD FOR OPERATING A CONTROL UNIT

TECHNICAL BACKGROUND

The present disclosure relates to a control unit for a motor vehicle, having a system on a chip with at least one computing unit for providing at least one vehicle function for a vehicle system, with at least one memory unit, and with at least one interface unit. In addition, the present disclosure relates to a motor vehicle and to a method for operating a control unit for a motor vehicle.

BACKGROUND

Vehicle functions of vehicle systems in modern motor vehicles, e.g., driver assistance functions of driver assistance systems or the like, are usually implemented in control units of the motor vehicle. In the context of an increasingly high degree of integration for reducing the installation space required, simplifying production, and improving performance, it is increasingly proposed that control units as a system on a chip (SoC) or comprising a system on a chip be implemented. Systems on a chip are programmable such that corresponding software that implements the vehicle function can be implemented for the systems on a chip. In this case, vehicle functions frequently differ significantly from vehicle system to vehicle system or from motor vehicle to motor vehicle, wherein vehicle functions implemented in software can be referred to as "operative software" relating to driving, regulating, controlling, displaying, and the like. If commercially available semiconductor chips or systems on a chip are used, they must be configured in a software-based manner in order to be able to implement the vehicle function. In this case, systems on a chip usually comprise one or more computing units (in particular, one or more CPU's or computing cores), which can also be referred to as logic units, one or more memory units, one or more interface units, and one or more data lines.

A problem with regard to motor vehicles is that services that have to meet specific requirements for motor vehicles, which makes them differ greatly from similar services from other industrial sectors, are also required in all or at least most control units, and thus systems on a chip. Such services that are used across vehicle functions include diagnostic functions, logging functions, security functions, function managers, and the like. In this case, in contrast to the operative software providing the at least one vehicle function, automotive-specific services are required in all control units—ideally in an unchanged manner. However, commercially available semiconductor chips support these motor-vehicle-specific services only in part or not at all, which is why these services, which are to be regarded as provided by additional functions in the following, have to be completely mapped in software.

However, such software solutions are prone to errors and must be developed or configured again for each project. Many functionally identical solutions are implemented independently and differently by different service providers, which generates high outlay in projects and makes the interoperability of the control units or vehicle systems prone to errors. This is demonstrated, for example, in services such as diagnostics and/or updates.

Another problem is that software solutions for services, i.e., service functions and/or system functions, cannot be used for other software components without repercussions (runtimes, memory access, response times, etc.). As a result, the control unit behavior is influenced by using these services. This is not desired—in particular, in the case of reactive, real-time capable control units or vehicle systems. Guaranteeing or verifying the absence of repercussions of this special software on safety-critical software parts requires recurring high development and safeguarding efforts.

DE 10 2017 219 242 A1 relates to a system on a chip that has an attack detection unit implemented as hardware, which is connected via a hardware signal connection at least to the input and/or output control unit as a component of the system on a chip. Input signals received from the input/output control unit are evaluated by means of the attack detection unit with respect to a rule violation of an attack detection rule set to be logged and/or to be responded to with at least one action. The hardware signal connection is configured as a signal line that is configured specifically for the signals to be transmitted and can be used only in one direction.

DE 10 2017 221 889 A1 relates to a data processing device that has an attack detection unit realized, in particular, as hardware. The attack detection unit is connected via a signal connection to a filter means and/or a security unit realized as a trusted execution environment of an authentication arrangement, and evaluates input signals received via the at least one signal connection with respect to a rule violation of a set of attack detection rules to be logged and/or responded to with at least one action. The filter means is at least in part configured as hardware and uses approval conditions, in order to forward only certain user data.

DETAILED DESCRIPTION

Figure 1:
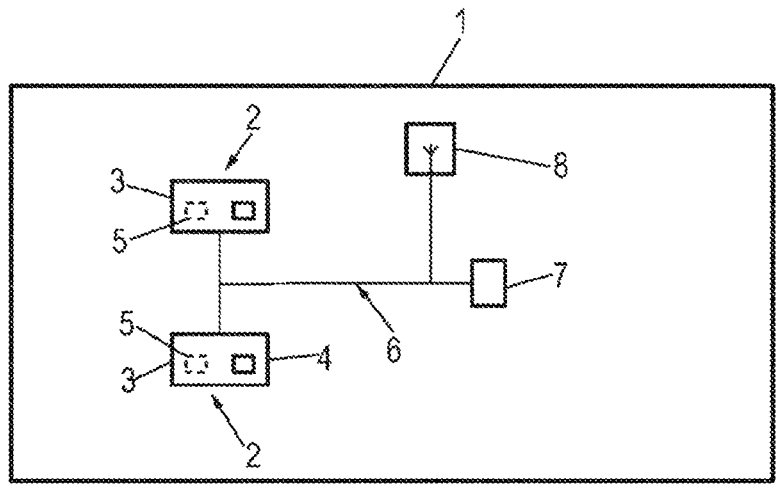
FIG. 1 is a schematic diagram of a motor vehicle according to the present disclosure.

The present disclosure is therefore based upon the object of providing an improved embodiment of a control unit in particular with regard to the implementation and performance of services that are to be used by different vehicle functions.

This object is achieved by a control unit, a motor vehicle, and a method for operating a control unit according to the independent claims. Advantageous embodiments result from the subclaims.

In a control unit of the type mentioned at the outset, it is provided according to the present disclosure that the system on a chip have at least one subsystem, which is logically separate from the components of the system on a chip that implement the at least one vehicle function, for providing at least one motor-vehicle-related additional function that provides a service, wherein the subsystem comprises at least
  a computing section,
  an additional function-specific interface section—in particular, forming a proxy and an additional function-specific communications bus that is connected at least to the computing section and to the interface section.

As is generally known, the system on a chip therefore has at least one computing unit—in particular, several computing units—which, together with at least one memory unit and at least one interface unit and data lines provided therefor—in particular, at least one communications bus—can implement the at least one vehicle function of the vehicle system, which at least one vehicle function is to be provided by the control unit, wherein the vehicle function is provided, in particular, at least substantially as software in the system on a chip. The at least one computing unit can be at least one CPU and/or at least one computing core. According to the present disclosure, it is now proposed to separate motor-vehicle-specific services, i.e., the at least one additional function, logically from the at least one vehicle function, which can relate in particular to driving and/or regulating and/or controlling and/or displaying, within the system on a chip, i.e., in particular the semiconductor chip, and to provide it as hardware integrated into the system on a chip. For this purpose, at least one specific service interface, which can also be referred to as a feature interface, and at least one exclusive communications bus, which can also be referred to as a feature bus, are provided in the form of the interface section, wherein the exclusive communications buses preferably connect all programmable logic units of the semiconductor chip, i.e., the computing unit, realizing the system on a chip to the corresponding interface section independently of other data lines/buses. This means that the at least one computing unit is connected to the communications bus. Therefore, in this way, viz., by means of the interface section and the communications bus, which are both exclusive and specific to the additional function, a communications path is already provided, which is independent of all communications paths used for the at least one vehicle function and thus does not interfere with real-time capability. Therefore, this means that the communications bus comprises a separate data line in the system on a chip, wherein, in addition, the interface section comprises a fixed, exclusive number of inputs and/or outputs reserved for the additional function, which, in exemplary embodiments, inputs and/or outputs can of course nevertheless be part of the at least one interface unit (input/output unit). Therefore, the interface section can be formed by a separate interface unit, but also by a reserved, defined component of the at least one interface unit also used for the at least one vehicle function, which component is to be used exclusively by the additional function.

The additional function, which can, particularly advantageously, be a service function and/or a system function, i.e., provides a specific service, is vehicle-related. This means that it meets at least one requirement specific to motor vehicles and/or motor vehicles of a specific motor vehicle class. In general, a service, as generally known, can be understood as an autonomous means that bundles coherent functionalities and provides them via a defined interface. Thus, for example, the service functionality integrated in the present case into the hardware of the system on a chip, i.e., the at least one additional function, can be used for different vehicle functions of motor vehicles of at least one specific vehicle class, e.g., all motor vehicles of a manufacturer, because clear interface definitions are provided by the subsystem, which ultimately standardizes the at least one additional function and thus the corresponding service. Therefore, it is known for all control units, and specifically systems on a chip provided for motor vehicles of the vehicle class, how the at least one additional function is to be called up and in which format and where, viz., at the interface section, it provides its information/signals or receives external information or signals. In this way, it is no longer necessary to redevelop motor-vehicle-related services taking into account the specific requirements for each system on a chip or control unit, and interoperability problems—in particular, between different control units—are significantly reduced.

However, the logical separation and integration of motor-vehicle-specific services in the form of at least one additional function in the logic of the semiconductor chip of the system on a chip also results in further advantages. Thus, the runtime of software for controlling vehicle functions is not influenced by simultaneously running services. Standardized interfaces for services, e.g., diagnostics and/or validation, are not newly developed every time. Providing the additional-function-specific communications bus and the additional-function-specific interface section allows the bandwidth for handling security functions to be made available. Complexity decreases in the development of software for control units in motor vehicles, while robustness increases. Software developers can concentrate on vehicle functions visible to the user of the motor vehicle, instead of implementing and safeguarding services that are necessary, but invisible to the user of the motor vehicle. By controlling complexity, it becomes possible to implement and establish innovative solutions—for example, the activation of hardware and/or software. In summary, the integration of standardized, logically separate services in the form of subsystems in the hardware of systems on a chip significantly reduces complexity in software development and safeguarding, while at the same time increasing the availability and robustness of the control units.

Access to the exclusive, additional-function-specific communications bus/interface section by the rest of the system on a chip, i.e., the subsystem, can be organized by special commands (opcodes) and/or reserved I/O and/or memory regions.

Specifically, it can be provided that the computing section be realized at least in part by at least one of the at least one computing unit of the system on a chip—in particular, by hard coding at least one additional-function-specific machine command with at least one assigned opcode in the computing unit. In an alternative, less preferred embodiment, it is also conceivable for the computing section to be realized at least in part by a separate computing unit assigned only to the additional function, which separate computing unit communicates with the at least one computing unit of the system on a chip, assigned to the at least one vehicle function, via the communications bus of the subsystem. Of course, a combination of these approaches is also conceivable.

If, as is preferred in the context of the present disclosure, the command set of machine commands of the at least one computing unit is extended, an extension of the computing capacity can preferably also be carried out—in particular, an assignment of computing capacities can be added to the at least one additional-function-specific machine command—in order, as far as possible, not to impair the execution of the at least one vehicle function. The added additional-function-specific machine commands and, in particular, their associated opcodes can also be standardized, i.e., in particular, follow a standard specification, such that they are the same for all control units of various motor vehicles—in particular, motor vehicles of the vehicle class. In summary, it is particularly advantageous in this context to provide at least one additional function, i.e., at least one service, which is hard-coded, i.e., integrated into the hardware, by means of the exclusive, additional-function-specific interface section ("feature interface"), the exclusive, additional-function-specific communications bus ("feature bus"), and specific hard-coded machine commands of the at least one computing unit with the assigned opcodes.

With regard to services that use memory on the system on a chip, it is possible, in the context of the present disclosure, for at least one memory area of the at least one memory unit to be permanently and/or variably assigned to the subsystem by a memory access unit. It is therefore conceivable to carry out fixed assignment of memory area of the at least one memory unit, which can be dimensioned accordingly, to the at least one additional function, i.e., to the subsystem. However, because modern systems on a chip usually have a memory access control unit, it is preferred to allow variable assignment in the context of general memory management of the system on a chip. Memory-mapped I/O for communication with the at least one memory unit of the system on a chip can be used particularly advantageously.

In a particularly expedient further development of the present disclosure, provision can be made for several logically separate subsystems to be provided for different additional functions. In this way, a plurality of services can be provided in an integrated manner within a system on a chip in terms of hardware technology and, in particular, can be used in particular by the at least one vehicle function, or externally, wherein, on the one hand, a standard specification for each of these services can be fulfilled and, on the other, robust implementation of the several additional functions is provided, which at least does not substantially impair the performance of the at least one vehicle function.

Nevertheless, it can be particularly advantageous in the case of several services if at least two of the subsystems are also configured for communication with one another—for example, because services and thus additional functions use one another. It can therefore be provided that at least one subsystem be connected to the communications bus of at least one further subsystem—in particular, a subsystem related to manipulation security and/or a security function. In this case, it is particularly advantageous if several, and in particular all, subsystems assigned to a further additional function are connected to the communications bus of a subsystem assigned to a security function, such that security aspects, e.g., the authentication of communications partners, encryption and decryption, and the like, are provided centrally via a service that can also be used by other services integrated as hardware into the system on a chip, which will be discussed in more detail below with reference to examples. In particular, repeated implementation of security mechanisms is avoided in this way.

In advantageous embodiments of the present disclosure, at least one of the at least one additional function can be a diagnostic function. In this case, the subsystem assigned to the diagnostic function—in particular, the interface section—can be configured for communication with at least one maintenance device, and/or the subsystem assigned to the diagnostic function can be configured to hold diagnostic-relevant operating data and/or event data of the control unit, which can be queried by means of the interface section, in the at least one memory unit and/or in a memory device external to the system on a chip. In particular for diagnostic functions in motor vehicles, there are many specifications, which are sometimes also manufacturer-specific—for example, with regard to diagnostic devices and/or diagnostic-relevant operating data to be kept on hand. For the input/output of vehicle diagnostic information, for example, a certain manufacturer can use its own tools—in particular, also diagnostic devices—in production and in workshops that are based upon standardized protocols. Due to manufacturer-related differences, compatibility with all vehicle manufacturers is not given and is also not always desired. A subsystem for a diagnostic function as an additional function, the interface section of which can be understood as a "diagnostic service interface," can, particularly advantageously, provide a manufacturer-specific proxy, or, more generally, a proxy for motor vehicles of a specific vehicle class that is tailored to the vehicle class—in particular, the manufacturer—e.g., with respect to tools for maintenance, and in particular diagnostic devices. The at least one computing unit of the system on a chip can preferably communicate directly with the subsystem of the diagnostic function, whether via the above-mentioned opcodes and/or via the communications bus of the subsystem. Due to the fact that all external requirements, e.g., those which from an external diagnostic device such as a tester, are abstracted by the subsystem, the at least one computing unit does not have to know or follow said external requirements.

Particularly advantageously, the subsystem assigned to the diagnostic function obtains access to volatile and/or persistent memories of the at least one memory unit such that the at least one computing unit does not have to take care of the management thereof, which comprises, for example, allocation, persistence, and the like. In particular, this means that, in one embodiment, all of the diagnostic-relevant operating data, which comprise, for example, measured value blocks, environmental data, and the like, can be stored by the subsystem assigned to the diagnostic function cyclically in a memory area used by the diagnostic function and are thus available in the case of diagnostics—in particular, retrievable via the interface section. Particularly advantageously, the subsystem assigned to the diagnostic function can also provide secure, i.e., authenticated, access to the diagnostic function representing a diagnostic service, for which purpose the subsystem assigned to the diagnostic function is particularly preferably configured for communication with a subsystem assigned to a security function—in particular, via a direct interface or by access to the communications bus of the security service.

In a specific embodiment, the implementation of the subsystem assigned to the diagnostic function in hardware on the semiconductor chip of the system on a chip can also allow diagnostic events, i.e., in particular event data detected by peripheral units and computing units (i.e., IP blocks overall) of the system on a chip—in particular, comprising the at least one interface unit, GPU's, CPU's, and the like—to be entered directly into the subsystem realizing the diagnostic function—for example, in the form of event data. As a result, it is no longer necessary to create software that transfers the error codes specific to the system on a chip to the vehicle diagnostics. For this purpose, the at least one peripheral unit/computing unit is, expediently, connected to the communications bus of the subsystem assigned to the diagnostic function. It should be noted here that such event data are of course also intended to be generated by the at least one computing unit of the system on a chip, in addition to peripheral units.

Moreover, the subsystem assigned to the diagnostic function can itself also be configured to evaluate an evaluation of diagnostic-relevant operating data with regard to the generation of further diagnostic-relevant operating data and/or control signals, such that, for example, certain measured values and/or functional variables can be checked cyclically. Should a deviation from a target behavior arise here, e.g., due to the fulfillment of a deviation criterion, a diagnostic event described, for example, by an error code as event data, can arise, i.e., be generated and stored. For example, functionalities such as the activation of a warning lamp or the like can be coupled to said error code. The subsystem assigned to the diagnostic function stores the error code or, in general, the event data until it is read out via an external retrieval device, e.g., the diagnostic device, such that a reset is possible.

In summary, with regard to the diagnostic function relating to the motor vehicle diagnostics as an additional function, it can therefore be stated that the processes necessary for this service are made available in the hardware of the system on a chip in such a way that the design of complex software for handling the motor vehicle diagnostics can be dispensed with, diagnostic-relevant operating data and/or event data can be stored and/or evaluated in a simple manner, motor vehicle-specific requirements for the diagnostic function are met, and a standardized procedure that always functions in the same manner with regard to motor vehicle diagnostics is provided.

As already mentioned, it is particularly advantageous in the context of a motor vehicle diagnostic function if there is a connection to a subsystem assigned to a security function—in particular, an authentication function, and in particular to the communications bus of said subsystem—because it is then possible, for example, for a diagnostic device, e.g., a tester, to query the corresponding security service to determine whether the diagnostic device is correctly authenticated, without this authentication process having to be implemented in the motor vehicle diagnostics itself.

It should then be noted at this point that an external memory device that can also be used by other types of additional functions, i.e., other services, can be part of the control unit and, for example, makes sense if larger quantities of diagnostic-relevant operating data and/or event data are to be stored or kept on hand and then retrieved at a later time.

In a further particularly advantageous embodiment of the present disclosure, it can be provided that at least one of the at least one additional function be a data export function—in particular, a logging function and/or a shadowing function and/or a validation function. Various services in motor vehicles require exporting operating data of the control unit and/or event data of the control unit or making said data available outside the control unit, wherein this is to take place without impairment of the at least one vehicle function—in particular, when the exported information is to be used to assess the at least one vehicle function. Such data export functions comprise, in particular, pure logging functions, validation functions, and what are known as shadowing functions, and are thus used, for example, for safeguarding and can therefore also be referred to as security functions. In general, it can be said that the subsystem assigned to the data export function is preferably configured for intermediate storage in the at least one memory unit and/or in a memory device external to the system on a chip of operating data to be exported of the control unit, and/or for controlling the data transport of operating data to be transmitted to a target device and/or for communication with the target device.

In a specific example, operating data from motor vehicles almost ready for series production may be necessary for enabling vehicle functions in certain areas—for example, the areas of safety, driver assistance, steering, braking, and drive systems. In order to detect this operating data, motor vehicles are equipped with special measuring technology devices, e.g., a data logger, which are connected to interfaces of the vehicle electronics, i.e., specifically to the control units. The detection of this operating data may have no influence on the at least one vehicle function that is running. This is because this would change the behavior of the at least one vehicle function, and the validation would be invalid.

A subsystem assigned to such a validation function, or the interface section of said subsystem, can therefore also be referred to as a "validation service interface." This can represent a proxy that is tailored precisely to the measuring technology device used, which is the target device already mentioned. By way of example, the at least one computing unit of the system on a chip can communicate directly with the subsystem via the communications bus of this subsystem. On the other hand, the subsystem assigned to the validation function abstracts all queries from the measuring technology device, i.e., in particular the target device, and performs the buffering of the data packets of the operating data. A broadband interface for storing the requested operating data is available to the at least one computing unit. In particular, the subsystem realizing the validation function can thus obtain access to volatile and persistent memories of the at least one memory unit and/or an external memory device, such that the at least one computing unit does not have to take care of the management thereof (allocation, buffering, persistence, and the like). In particular, it can be provided, in one exemplary embodiment, that all necessary operating data, e.g., comprising measurement data, be stored cyclically and be available, if necessary, i.e., in particular, upon request, to the measurement technology. In this case, the flow control for data access can also take place by means of the external measuring technology device, i.e., in particular, the target device.

It is also true for the subsystem assigned to the validation function that it can particularly preferably provide secure, authenticated access to the validation function and the operating data, for which purpose it particularly preferably has a connection to a subsystem realizing a security function—in particular, to the communications bus thereof. For example, a querying target device can be authenticated.

The embodiments described by way of example here for the validation function can, of course, also be applied to other types of data export functions. A further type of data export function that is becoming increasingly important and is often subject to motor-vehicle-specific requirements is a shadowing function. Shadowing means decoupling certain operating data, ideally without influencing the at least one vehicle function, which can also be referred to as seamless removal, wherein said operating data are preferably to be forwarded to a target device external to the motor vehicle, where they can be evaluated particularly preferably together with further operating data obtained in this way—in particular, for the purpose of further developing the at least one vehicle function. Such evaluation can be understood as a big data evaluation, such that—in particular, by continuous improvement of the at least one vehicle function—a type of "big loop" is produced due to shadowing, which can represent a continuous circuit of feedback and improvement measures.

It should be pointed out at this point that a data export function can, of course, also be a summary of different sub-functions, e.g., a subsystem providing a data export function can provide the services of logging, validation, and shadowing as a whole. Of course, it is also conceivable in other embodiments to at least in part provide different subsystems for the different types of data export functions.

As already indicated—in particular, through interaction with other subsystems—an advantageous further development of the present disclosure provides that at least one of the at least one additional function be a security function, wherein the subsystem assigned to the security function is configured for controlling encryption and/or decryption means for output data and/or input data of the system on a chip and/or for performing at least one authentication process for a communications partner of the control unit. In this case, the authentication is in the foreground as a service that can particularly advantageously be implemented via a sub system.

The protection against manipulation, or "automotive security" in general terms, places particular demands on security functions in control units of motor vehicles. In addition to securing internal and external communication—in particular, by means of authentication—these also includes the distribution and management of digital keys. Systems have already been proposed in the prior art in which decryption and/or encryption means and associated memory units with keys and/or purely monitoring attack detection units were also implemented in hardware in the system on a chip, without, however, providing services in this respect—in particular, services relating to the authentication of communications partners. Therefore, it is already known that, during processing—in particular, of distributed vehicle functions in one or more systems on a chip—the recurring task arises of encrypting or decrypting operating data and/or other information, wherein the proportion of encrypted communication data increases as a result of legal provisions—for example, with regard to data protection and new attack methods. To ensure that no excessively large proportion of available computing power is bound by the encryption/decryption, it has therefore already been proposed to implement encryption and/or decryption means—in particular, special accelerator units—in hardware in the at least one interface unit—in particular, parallel to a path of unencrypted communication. As a result of such pure implementation in hardware, which can also be provided within the scope of the present disclosure, the corresponding throughput of communication data can be made possible, and at the same time the at least one computing unit can be relieved. Vectorization allows scaling the desired data rates to be achieved. Furthermore, a "secure key memory" can also already be present here, which provides at least one key to the encryption and/or decryption means and/or at least one computing unit for executing the encryption and decryption processes. Such keys can also be used or created in the context of the authentication.

However, such a hardware-encoded encryption and/or decryption arrangement requires special driver software in conventional systems on a chip, which driver software must then be suitably developed and requires power and bandwidth within the system on a chip or causes susceptibility to errors in the conventional components—in particular, when—for example, depending upon the communications partner—different keys and/or different encryption and/or decryption techniques are to be used. Accordingly, a subsystem that provides the corresponding service and is assigned to the security function can, according to the present disclosure, be configured to provide control of encryption and/or decryption means and/or key management, and, preferably, additionally or alternatively, authentication with respect to different communications partners using the additional exclusive communications bus, without the at least one vehicle function being impaired. Consequently, the subsystem assigned to the security function provides a tightly coupled solution—for example, via corresponding opcodes. The operations of controlling the encryption and/or decryption means and/or key management and/or authentication thus do not compete with the execution of the at least one vehicle function, such that no incalculable runtimes are generated. In a specific embodiment, it can be provided, e.g., with regard to authentication, that authentication of a specific communications partner be requested via at least one corresponding opcode and/or the communications bus of the subsystem assigned to the security function, which authentication can then be brought about accordingly via the interface section.

It can also be expediently provided within the scope of the present disclosure that at least one key used by the security function be hard coded in a tamper-resistant memory unit of the system on a chip. Corresponding embodiments in this regard are already largely known from the prior art, such that this does not have to be explained in more detail here.

In a particularly advantageous development of the present disclosure, at least one of the at least one additional function can be an enabling function for hardware and/or software function extensions, which enabling function is integrated in particular into the security function and/or cooperates therewith. In a specific embodiment, it can be provided that the subsystem assigned to the enabling function be configured to provide at least one item of release information describing the use of enabled hardware and/or software of the system on a chip to the at least one vehicle function, and/or to communicate—in particular, with protection by authentication and/or encryption—with a motor-vehicle-external backend device, via its interface section, that provides enabling switching information. During evaluation by the subsystem assigned to the enabling function, an item of enabling switching information related to a hardware and/or software component changes the enabling information in such a way that the entry of the release information associated with the hardware and/or software component described by the enabling switching information is changed according to the enabling switching information. In this way, it is thus possible, on the basis of a special, standardized, and fundamentally existing service realized by means of the enabling function, to activate and/or deactivate specific functionalities, represented by hardware and/or software components, permanently or temporarily. This is relevant in particular for business models in which a user of a motor vehicle can at least temporarily activate certain functionalities in exchange for payment. The activation (or possibly also deactivation) of this functionality can be retrieved by a backend device, e.g., by means of a subscription from the Internet, by an app, and/or directly during production. As a result of this dynamic switching option, a user can match his/her profile to the motor vehicle within a very short time and thus achieve a higher degree of personalization while maintaining safety.

For this purpose, components (modules) that can be activated or deactivated by means of the enabling information can be present both in the hardware, i.e., the semiconductor chip of the system on a chip itself, and in the software. For the dynamic activation of components in hardware/software, complex implementations have hitherto been necessary, which comprise authentication, exchange of digital keys, and/or communication with a backend device (cloud, payment system, or the like). According to the present disclosur vention, this can now be realized, in a one-time, standardized manner that at least substantially does not affect the at least one vehicle function, by means of the subsystem assigned to the enabling function. The subsystem can also be understood as an "enabler service interface," for example. Particularly preferably, the subsystem assigned to the enabling function can carry out the overall enabling functionality together with a subsystem, assigned to a security function, which in particular relates to the authentication and key management. In particular, the security function can also be used to implement the routines for communicating with the backend device.

In a specific embodiment, the at least one logic unit can use the communications bus of the subsystem, realizing the enabling function via special opcodes, to communicate with the "enabler service interface," and in particular to request the enabling information, such that it is possible to determine in a simple manner which hardware components and software components are enabled. As a result of mapping in the hardware of the system on a chip, the enabling capability also extends to encryption resources—for example, additional computing units such as CPU's and/or GPU's. In a particularly advantageous embodiment, the enabling information can be provided via a register. This means, for example, that, when authentication is carried out—in particular, based upon enabling switching information received—certain registers in the system on a chip can be written to in order to enable additional functionalities—in particular, at least one hardware component and/or at least one software component.

In this case, such a configuration with an enabling function as an additional function, i.e., an enabling service, is expedient not only with regard to business models, but also with regard to scalability of the control unit according to the present disclosure with regard to an expanded field of use across various series—in particular, of the motor vehicle class.

In addition to the control unit, the present disclosure also relates to a motor vehicle comprising at least one control unit according to the present disclosure. All statements regarding the control unit according to the present disclosure can apply analogously to the motor vehicle according to the present disclosure.

Finally, the present disclosure also relates to a method for operating a control unit according to the present disclosure, wherein the additional function providing the at least one service—in particular, as a service and/or system function—is carried out exclusively by means of the subsystem assigned thereto. With regard to the method according to the present disclosure, the statements regarding the control unit according to the present disclosure of course also apply correspondingly.

FIG. 1 shows a schematic diagram of a motor vehicle 1 according to the invention. The motor vehicle 1 has several vehicle systems, e.g., comprising driver assistance systems, of which two vehicle systems 2 are indicated by way of example, each having at least one control unit 3. The control units 3 are configured according to the invention and comprise at least one system on a chip 4 and optionally a memory device 5 that can be used by a service and is external to the system on a chip 4. The control units 3 can be connected to one another, for example, via a bus system 6 of the motor vehicle 1 and to further components/vehicle systems 2, wherein, in the present case, a diagnostic interface 7 and a communication device 8 are shown, which also allow communication with the Internet via a mobile radio network.

In the present case, the systems on a chip 4 of the control units 3 are configured identically in terms of their hardware, even if they perform different vehicle functions of the respective vehicle systems 2 by means of software. Each of the systems on a chip 4 has, in the present case, several subsystems implemented as hardware, by means of which additional functions for providing different services are carried out logically separately from the respective vehicle functions. Each subsystem has a computing section that can be realized as a separate computing unit or part of another computing unit of the system on a chip 4, a communications bus realized as a separate data line, which is exclusively used by the additional function, and an interface section, which in the present case is also used exclusively by the additional function and cannot form the part of at least one interface unit of the system on a chip 4. The respective services are therefore realized by the autonomous subsystem implemented as hardware and have a clearly defined interface to the outside, which in the present case is implemented, with respect to the system on a chip 4 or, more specifically, the at least one vehicle function of each control unit 3, as opcodes of an extended command set of machine commands, on the part of the interface section, by a corresponding interface definition that forms or meets a standard.

Therefore, logical separation of the motor-vehicle-specific services from the vehicle functions within the semiconductor chip of the system on a chip is given, wherein all vehicle-specific requirements—in particular, for the services—are accordingly met. In this case, specific interface sections and exclusive communications buses are introduced, as well as, in the present embodiment, extensions of the command set of machine commands.

Figure 2:
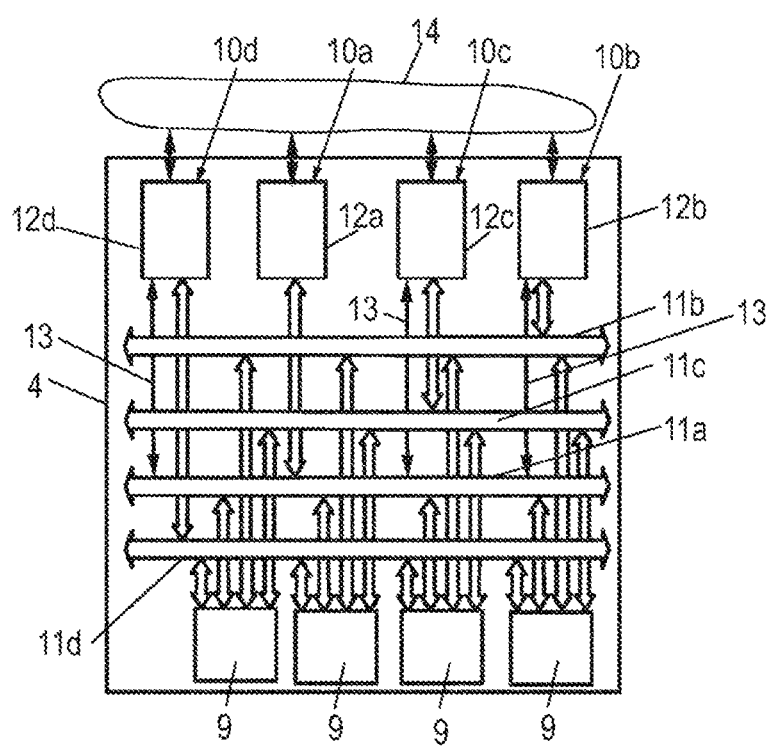
FIG. 2 is a functional structure of a system on a chip in a control unit according to the present disclosure.

This basic structure is now shown more accurately in FIG. 2. Accordingly, in this embodiment, the system on a chip 4 has four computing units 9 that, for example, can be connected via a basic communications bus or a basic data line (not shown for the sake of clarity) and can be connected to an interface unit (not shown in greater detail here). In addition, however, four subsystems 10a, 10b, 10c, and 10d are also provided in the present case, wherein each of these subsystems 10a, 10b, 10c, and 10d has a communications bus 11a, 11b, 11c, 11d as well as an interface section 12a, 12b, 12c, and 12d. The computing sections (not shown here for the sake of clarity) can be implemented at least in part by the computing units 9 and/or the interface portions 12a, 12b, 12c, and 12d. All computing units 9 are connected to each of the communications buses 11a, 11b, 11c, and 11d, wherein the interface sections 12a, 12b, 12c, and 12d are connected to the respective associated communications buses 11a, 11b, 11c, and 11d. Subsystem 10a is assigned to a security service, i.e., it serves to perform a security function. Subsystem 10b is assigned to a diagnostic function, subsystem 10c is assigned to a data export function—in this case, specifically, to a logging function, a validation function, and a shadowing function—and subsystem 10d is assigned to an enabling function. Because each additional service, apart from the security function, is to use the security function, as will be explained in more detail, communication of the subsystems 10b, 10c, and 10d with the subsystem 10a is established in the present case by the respective interface section 12b, 12c, and 12d being additionally connected to the communications bus 11a; cf. arrows 13.

Communications partners—e.g., target devices for exported operating data, diagnostic devices, a backend device, a server device, and the like—which gain access externally or communicate with the subsystems 10a, 10b, 10c, and 10d, are indicated in FIG. 2 with the reference sign 14 in communication with the corresponding interface sections 12a, 12b, 12c, and 12d (double arrows).

Figure 3:
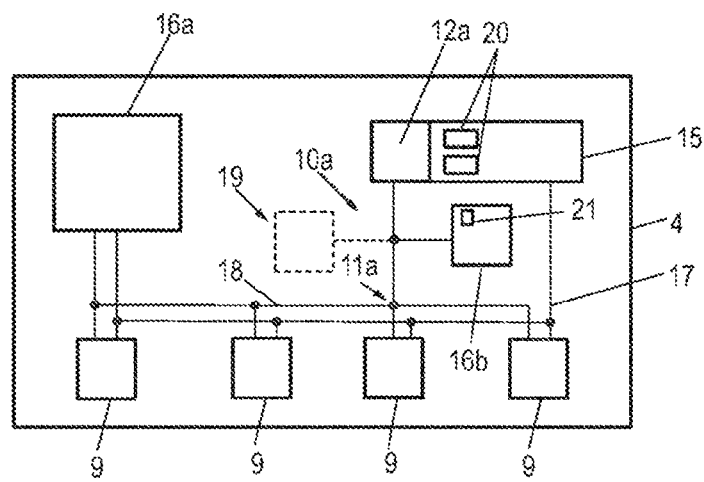
FIG. 3 is a functional schematic diagram of a system on a chip in a specific embodiment.

A more specific structure is shown in FIG. 3, but for the sake of simpler illustration only for the subsystem 10a assigned to the security function. Accordingly, as part of the semiconductor chip of the system on a chip 4, an interface unit 15 and, in the present case, two memory units 16a, 16b are formed next to the four computing units 9 already mentioned. A main data line 17, which connects the memory unit 16a, the computing unit 9, and the interface unit 15, represents a main communications bus that is used by the at least one vehicle function. A further data line 18 realizes the communications bus 11a of the subsystem 10a and additionally contains a connection to the memory unit 16b. Optionally, a further computing unit 19 can be provided as part of the computing section of the subsystem 10a. A memory management unit can also be present as a component (not shown).

In the present embodiment, the interface section 12a is formed by a portion of the interface unit 15. Also integrated into interface unit 15 are decryption and encryption means 20 that serve for secure communication with communications partners. At least one corresponding key 21 can be hard coded in the memory unit 16b.

The subsystem 10a assigned to the security function is now configured, on the one hand, in the context of the security service, to allow authentication of communications partners 14 via the interface section 12a if said authentication was requested via a corresponding opcode from at least one of the at least one vehicle function. In this case, various authentication methods can be used specifically or provided by the subsystem 10a, wherein in particular keys such as the hard-coded key 21 can also be used. However, the security function is also used for controlling the encryption and decryption means 20 and for key management. For example, matching keys can be selected for suitable communications partners 14, and/or key negotiations can be performed.

Figure 4:
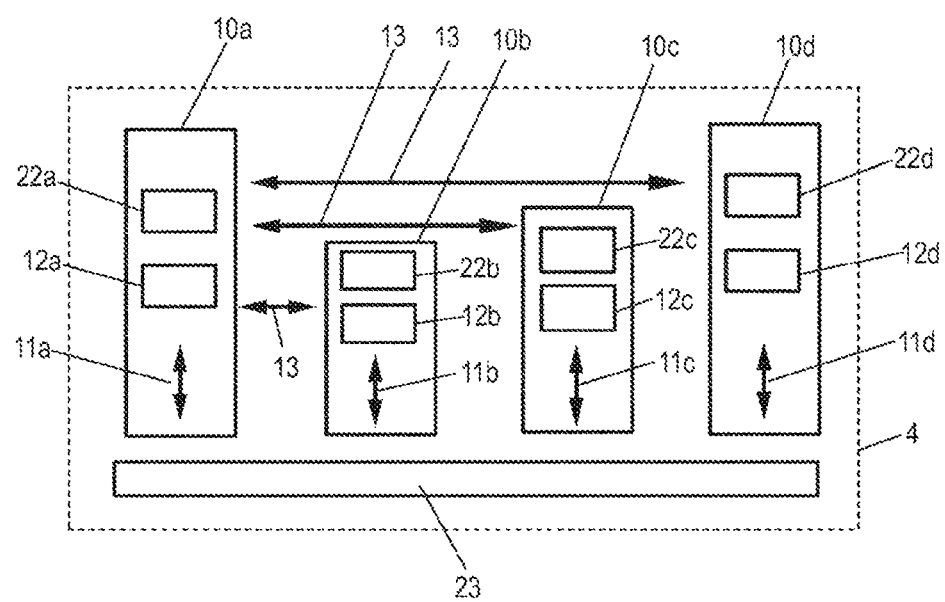
FIG. 4 is a representation illustrating the logical separation of subsystems and vehicle functions.

In the form of a schematic diagram, FIG. 4 again briefly explains the basic principle of the present invention. There, the subsystems 10a, 10b, 10c, 10d realizing the various services are shown with their corresponding computing sections 22a, 22b, 22c, 22d, interface sections 12a, 12b, 12c, and 12d, as well as communications buses 11a, 11b, 11c, 11d as means that are logically separate from the at least one vehicle guidance function 23 and from one another, which means therefore autonomously provide their corresponding services and can all use the security service of the subsystem 10a (cf. arrows 13) by accessing the "security bus," i.e., the communications bus 11a.

The subsystem 10b assigned to the diagnostic function, which therefore provides a diagnostic service, can, for example, cyclically buffer or store diagnostic-relevant operating data and/or—in particular, in an event-controlled manner—event data in the memory unit 16a or the memory device 5. The subsystem 10b is in particular also configured for associated memory management. Furthermore, the subsystem 10b allows communication with maintenance tools and other diagnostic-related communications partners 14—in particular, diagnostic devices—by means of the corresponding interface section 12b, which communication can also be secured using the subsystem 10a (security service). In particular, diagnostic-relevant events that are recognized by the IP blocks of the system on a chip, e.g., the computing units 9, can be suitably stored and/or communicated directly, because they have to be easily provided to the corresponding communications bus 11b.

The subsystem 10c can serve, in particular, to tap operating data for validation and shadowing, thus implementing a validation function and a shadowing function as services. In this case, for example, a target device can serve as a communications partner 14 for the operating data to be exported, to which a secure connection can be established thanks to the subsystem 10a. An example of a target device is also a measuring technology device for validation, which is located in the motor vehicle 1 and can be used as a target for the operating data being exported. In shadowing, the target device is frequently a server device of the Internet, where a big data evaluation can take place in order to be able to improve the at least one vehicle function—for example, in the sense of a "big loop." Other logging requirements can also be satisfied or fulfilled. The memory unit 16a and/or the external memory device 5 can in turn be used for buffering or intermediate storage.

The subsystem 10d can, finally, control the enabling of hardware components and/or software components (also referred to as hardware modules and/or software modules), for which purpose a special register of one of the memory units 16a, 16b can be used to provide corresponding enabling information. The interface section 12d can in this case communicate with a backend device as a communications partner 14 in order to obtain enabling switching information if, for example, new hardware and/or software components are enabled by purchase or the like. The service provided by the enabling function can also already be used to adjust or scale the control unit 3 to the corresponding vehicle model during production, for example.

The invention claimed is:

1. A control unit for a motor vehicle, the control unit comprising:
  a system-on-a-chip that comprises:
  a plurality of components of the system-on-a-chip that implement at least one vehicle function, the plurality of components comprising:
    at least one computing unit comprising at least one central processing unit (CPU) and/or at least one computing core,
    at least one memory unit, and
    at least one interface unit; and
  a plurality of subsystems that are logically separate from the plurality of components of the system-on-a-chip, wherein each subsystem of the plurality of subsystems is configured to implement at least one motor-vehicle-related additional function that provides a service, and wherein each subsystem comprises:
    a computing section comprising the at least one CPU and/or the at least one computing core;
    an additional function-specific interface section at which the at least one motor-vehicle-related additional function provides its information and/or signals, and receives external information and/or signals; and
  an additional function-specific communications bus that is connected at least to the computing section and to the additional function-specific interface section.

2. The control unit of claim 1, wherein at least one part of the computing section is implemented in the at least one computing unit of the system-on-a-chip, and/or the at least one part of the computing section is implemented in its own computing unit only associated with an additional function.

3. The control unit of claim 1, wherein the additional function-specific communications bus comprises a separate data line in the system-on-a-chip and/or is connected to the at least one computing unit.

4. The control unit of claim 1, wherein at least one memory area of the at least one memory unit is permanently and/or variably assigned to each subsystem by a memory access control unit.

5. The control unit of claim 1, wherein each sub system of the plurality of subsystems is provided for different additional functions of a plurality of additional functions.

6. The control unit of claim 5, wherein each subsystem of the plurality of subsystems is connected to the additional function-specific communications bus of at least another subsystem.

7. The control unit of claim 1, wherein the at least one motor-vehicle-related additional function is a diagnostic function.

8. The control unit of claim 7, wherein each subsystem assigned to the diagnostic function is configured to communicate with at least one diagnostic device, and wherein the additional function-specific interface section is configured to communicate with the at least one diagnostic device.

9. The control unit of claim 8, wherein each subsystem assigned to the diagnostic function is configured to hold, in the at least one memory unit and/or in a memory device external to the system-on-a-chip, diagnostic-relevant operating data and/or event data of the control unit, and
wherein the diagnostic-relevant operating data and/or event data of the control unit is to be queried by means of the additional function-specific interface section.

10. The control unit of claim 7,
wherein the at least one motor-vehicle-related additional function is a data export function, and
wherein each subsystem assigned to the data export function is configured for intermediate storage in the at least one memory unit and/or in a memory device external to the system-on-a-chip, and/or for controlling data transport of operating data of the control unit to be transferred to a target device and/or for communication with the target device.

11. The control unit of claim 1,
wherein the at least one motor-vehicle-related additional function is a security function, and
wherein each subsystem is configured for controlling encryption and/or decryption means for output data and/or input data of the system-on-a-chip and/or for performing at least one authentication process for a communications partner of the control unit.

12. The control unit of claim 11, wherein each subsystem assigned to the security function is configured to determine, for a diagnostic subsystem, whether a diagnostic device is correctly authenticated.

13. The control unit of claim 11, wherein the at least one motor-vehicle-related additional function is a validation function, and
wherein each subsystem assigned to the security function is configured to provide secure and authenticated access to the validation function and operating data of each subsystem of the plurality of subsystems assigned to the validation function.

14. The control unit of claim 1, wherein the at least one motor-vehicle-related additional function is an enabling function for hardware and/or software function extensions.

15. The control unit of claim 14, wherein each subsystem assigned to the enabling function is configured to provide, to the at least one vehicle function, at least one item of enabling information describing hardware and/or software of the system-on-a-chip, and
wherein the hardware and/or software is enabled for use, and/or to communicate with a motor-vehicle-external backend device via the additional function-specific interface section thereof, and wherein the motor-vehicle-external backend device provides enabling information.

16. The control unit of claim 1, wherein at least one additional specific machine command is hard coded with at least one assigned opcode in the at least one computing unit.

17. A motor vehicle comprising:
at least one control unit having a system-on-a-chip, the system-on-a-chip comprising:
a plurality of components of the system-on-a-chip that implement at least one vehicle function, the plurality of components comprising:
at least one computing unit comprising at least one central processing unit (CPU) and/or at least one computing core,
at least one memory unit, and
at least one interface unit; and
a plurality of subsystems that are logically separate from the plurality of components of the system-on-a-chip, wherein each subsystem of the plurality of subsystems is configured to implement at least one motor-vehicle-related additional function that provides a service, and wherein each subsystem comprises:
a computing section comprising the at least one CPU and/or the at least one computing core;
an additional function-specific interface section at which the at least one motor-vehicle-related additional function provides its information and/or signals, and receives external information and/or signals; and
an additional function-specific communications bus that is connected at least to the computing section and to the additional function-specific interface section.

18. A method for operating a control unit in a motor vehicle, the method comprising:
providing, using a plurality of components, at least one vehicle function for a vehicle system, the plurality of components comprising at least one computing unit comprising at least one central processing unit (CPU) and/or at least one computing core, at least one memory unit, and at least one interface unit, the plurality of components being a part of a system-on-a-chip, the system-on-a-chip further including a plurality of subsystems that are logically separate from the plurality of components;
implementing, by the plurality of components, the at least one vehicle function; and
providing, by each subsystem of the plurality of subsystems, at least one motor-vehicle-related additional function, wherein each subsystem comprises a computing section comprising at least one CPU and/or the at least one computing core, an additional function-specific interface section at which the at least one motor-vehicle-related additional function provides its information and/or signals, and receives external information and/or signals, an additional function-specific communications bus that is connected at least to the computing section and to the additional function-specific interface section.

* * * * *